United States Patent

[11] 3,613,545

[72] Inventor Mark J. Cohn
 123 South Berkley Square, Atlantic City, N.J. 08401
[21] Appl. No. 788,731
[22] Filed Jan. 3, 1969
[45] Patented Oct. 19, 1971

[54] FILM-HOLDING CAMERA CONSTRUCTION AND FILM PACKAGE
 4 Claims, 13 Drawing Figs.
[52] U.S. Cl. ................................................. 95/66
[51] Int. Cl. ........................................... G03b 17/26
[50] Field of Search .......................................... 95/66, 23, 24, 25, 41, 67, 71

[56] References Cited
UNITED STATES PATENTS
2,477,304 7/1949 Land ............................ 95/66 X
2,609,296 9/1952 Land ............................ 95/13 X Primary Examiner—Samuel S. Matthews
Assistant Examiner—Monroe H. Hayes
Attorney—Robert K. Youtie ABSTRACT: A housing for holding film in operative association with a camera, the housing having an edge slot for insertion and withdrawal of the film, a pressure roll in the housing for rolling engagement with the film package upon insertion and withdrawal thereof, and a coiling roll in the housing engageable with a film package upon insertion to open the package for exposure within the camera and to close the film package upon withdrawal from the housing.

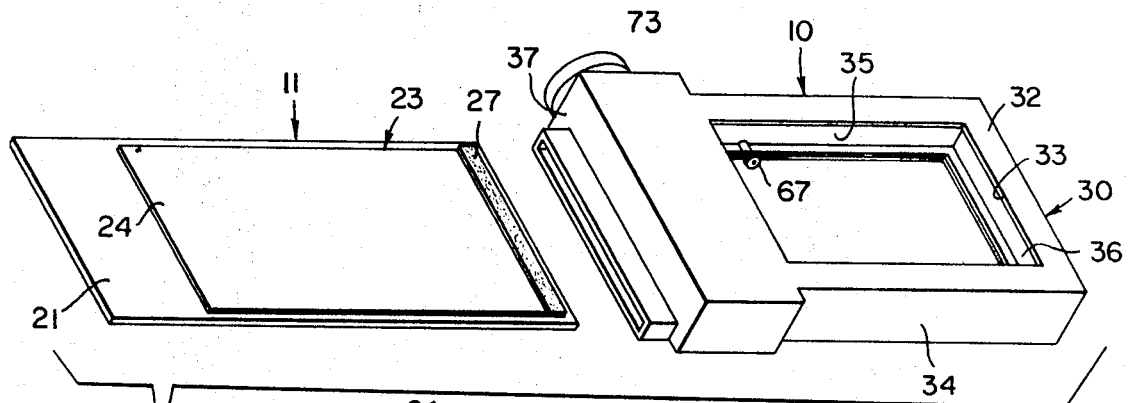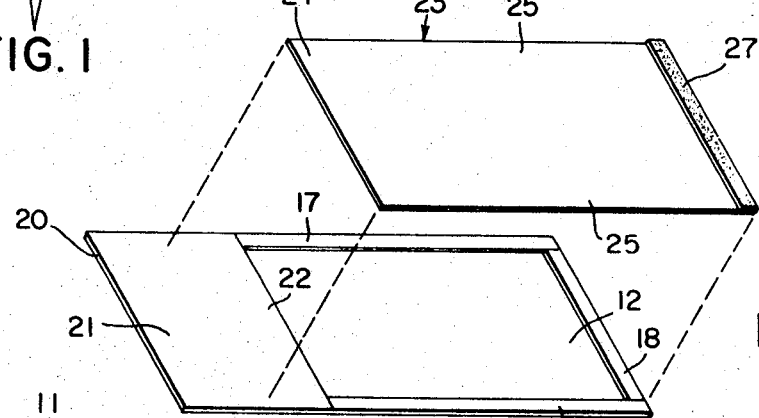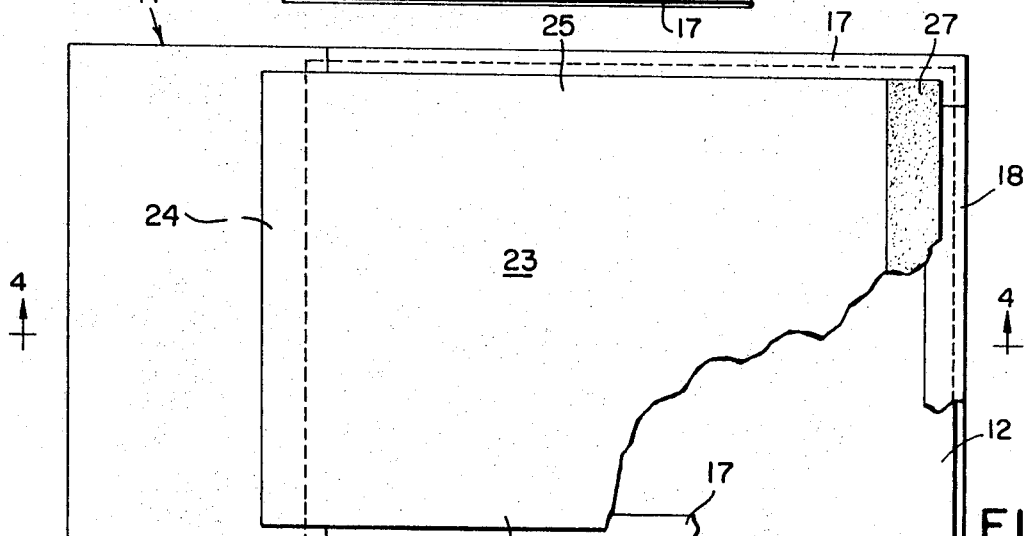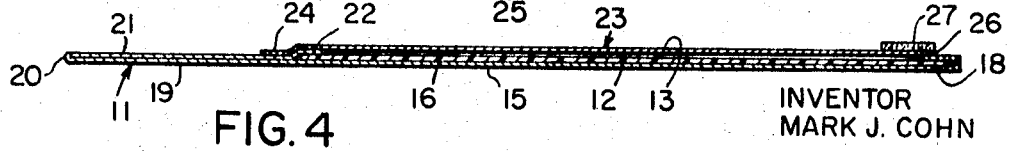

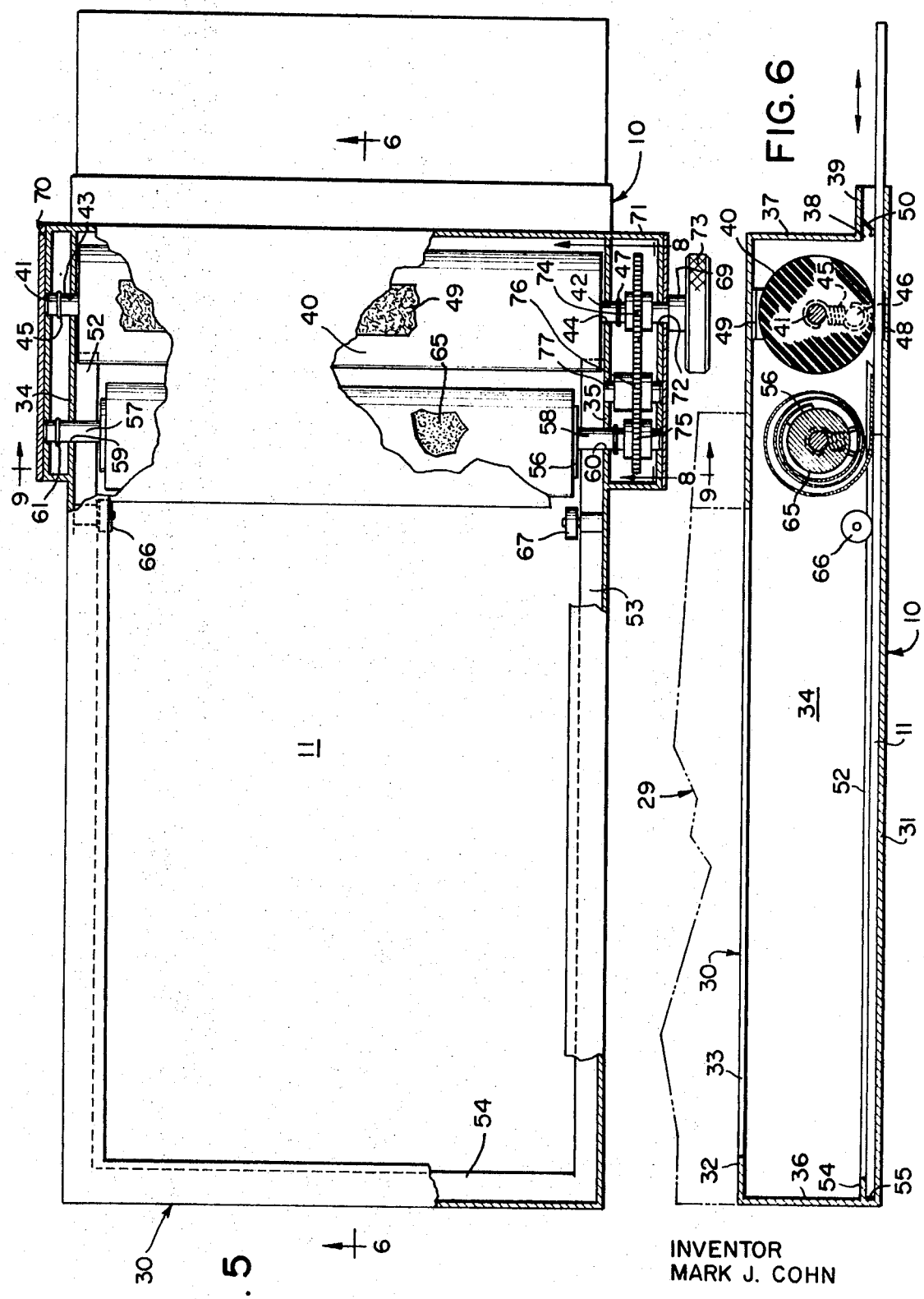

INVENTOR
MARK J. COHN

BY Robert K. Youtie

ATTORNEY

INVENTOR
MARK J. COHN

BY Robert K. Youtie

ATTORNEY

३,६१३,५४५

FILM-HOLDING CAMERA CONSTRUCTION AND FILM PACKAGE

BACKGROUND OF THE INVENTION

As is well known to those versed in the art, the use of photographic film in flat or sheet form is preferred for many purposes, particularly by professional photographers. However, sheet or flat film, while being advantageous in many respects, has heretofore suffered several difficulties, for example, requiring the loading into a film holder under darkroom conditions, and the relative bulk of conventional holders for sheet film making their use cumbersome in the field. It was heretofore necessary for a professional photographer to preload a number of film holders in a darkroom, transport a large number of relatively bulky film holders to the location of use, and thereafter awkwardly manipulate the cumbersome film holders, while hoping that the previously loaded film would be satisfactory for the unknown and variable lighting conditions at the point of use. Thus, in addition to the tedious labor and inconvenience of preloading under darkroom conditions, prior use of sheet film limited the versatility of conditions under which the photographer was able to operate at the point of film exposure. Subsequent to use, the ungainly sheet film holders were necessarily returned for processing of the contained film and reloading of the holders.

SUMMARY

Accordingly, it is an important object of the present invention to provide a camera construction and film package which overcomes the above-mentioned difficulties, enabling professional, as well as amateur photographers to obtain the advantages of sheet film use without the serious drawbacks mentioned above. In particular, the photographic devices of the present invention completely eliminate the need for film holders at all. This is particularly advantageous in the use of color film which has poor storage characteristics. In accordance with the teachings of the instant invention, a film package of flat or sheet film is merely inserted edgewise into a camera, the film exposed in the camera, and the film package withdrawn, after which it is subjected to the usual developing procedure.

It is another object of the present invention to provide a film package having the advantageous characteristics mentioned in the preceding paragraph, which is extremely simple in construction, compact so as to occupy a minimum of space, of negligible weight, and which can be economically manufactured for sale at a reasonable price.

It is still a further object of the present invention to provide a camera construction wherein a film package is received by edgewise insertion thereof, and the film package is automatically opened for a selected exposure through the lens, and merely withdrawn from the camera construction to effect automatic, light-sealing closure of the package.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a perspective view illustrating a camera construction and film package in accordance with the teachings of the instant invention.

FIG. 2 is an exploded perspective view of the film package of FIG. 1.

FIG. 3 is a plan view of the film package of FIG. 1, partly broken away for clarity of understanding.

FIG. 4 is a longitudinal sectional view taken generally along the line 4—4 of FIG. 3.

FIG. 5 is a front elevational view of the camera device of FIG. 1, enlarged and partially broken away for clarity, illustrating a film package fully inserted therein.

FIG. 6 is a longitudinal sectional view taken generally along the line 6—6 of FIG. 5.

DESCRIPTION OF THE PREFERRED EMBODIMENTS

Figure 7:
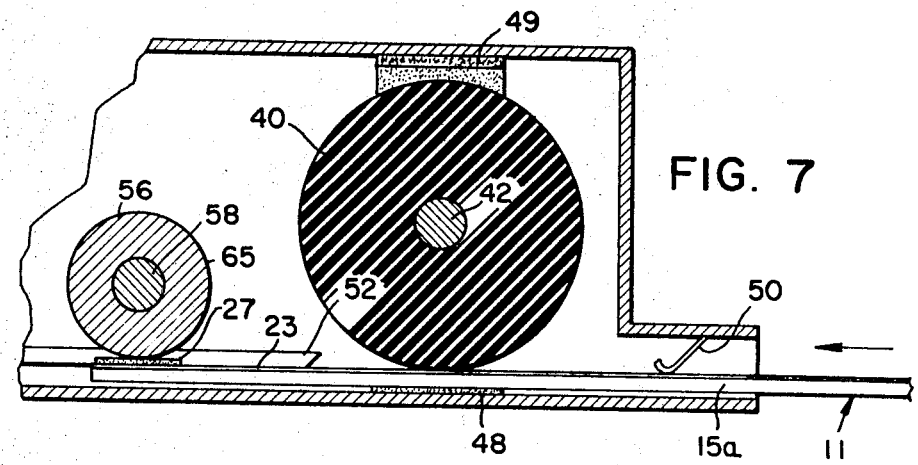
FIG. 7 is a partial longitudinal sectional view similar to FIG. 6, but illustrating a film package at an intermediate stage of insertion and withdrawal.
Figure 8:
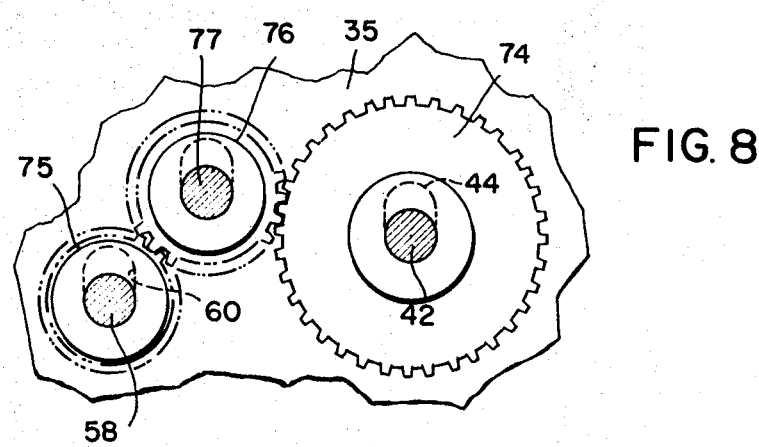
FIG. 8 is a partial sectional view taken generally along the line 8—8 of FIG. 5.
Figure 9:
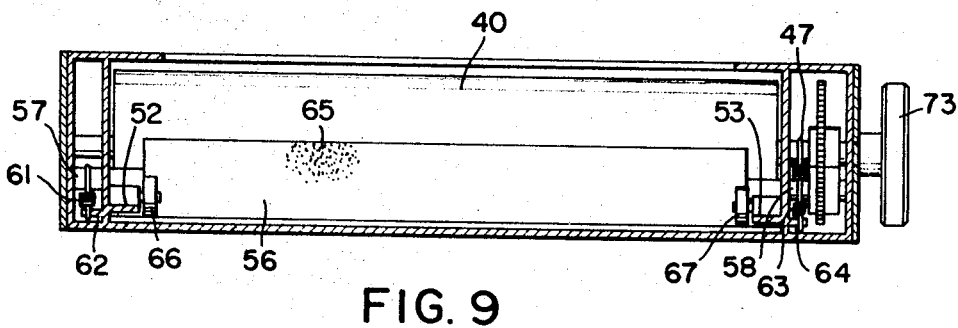
FIG. 9 is a transverse sectional view taken generally along the line 9—9 of FIG. 5.
Figure 10:
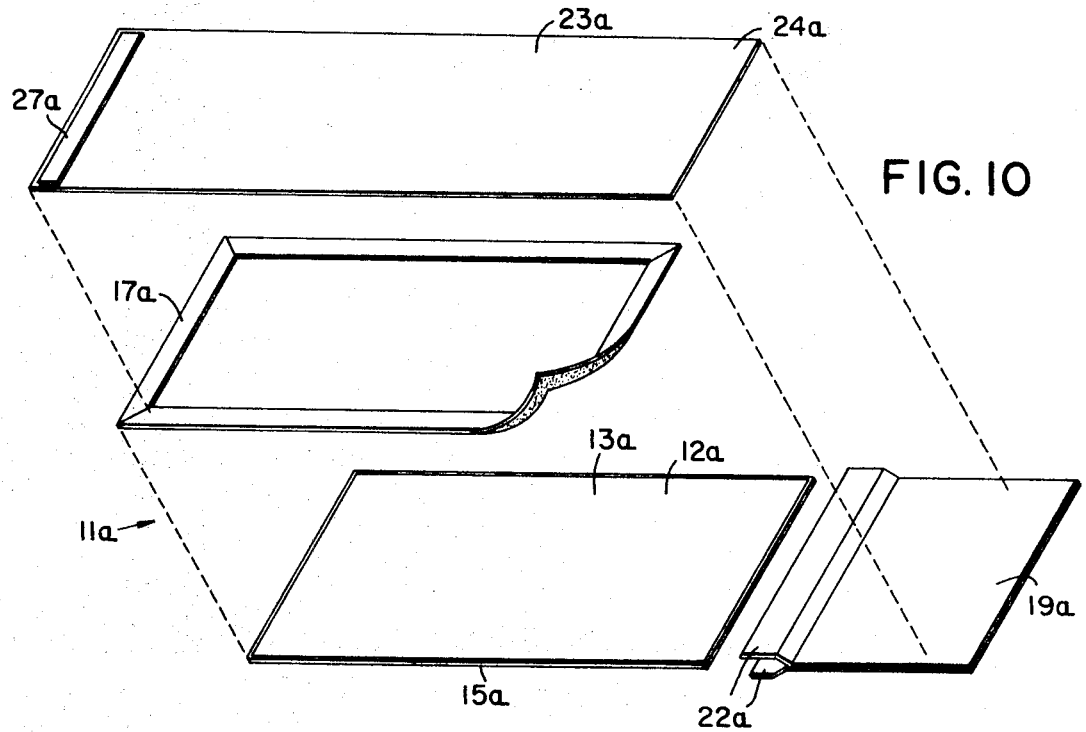
FIG. 10 is an exploded perspective view showing a slightly modified form of film package of the present invention.
Figure 11:
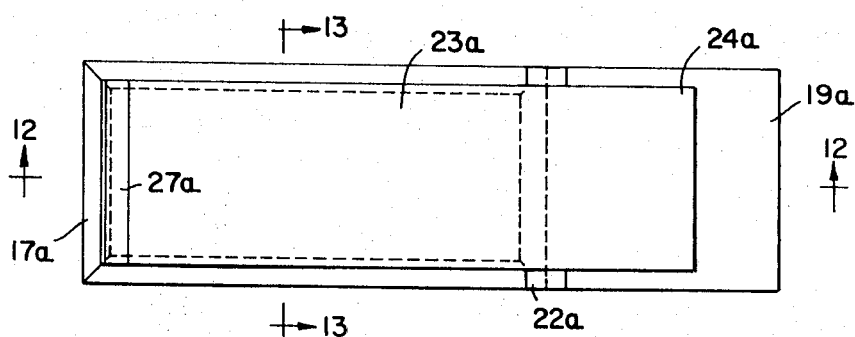
FIG. 11 is a plan view showing the film package of FIG. 10.
Figure 12:
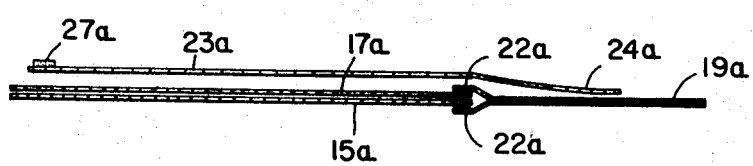
FIG. 12 is a longitudinal sectional view taken generally along the line 12—12 of FIG. 11, slightly exploded.
Figure 13:
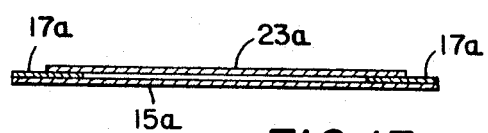
FIG. 13 is a transverse sectional view taken generally along the line 13—13 of FIG. 11.

Referring now more particularly to the drawings, and specifically to FIG. 1 thereof, there is illustrated therein a film-package-holding device, generally designated 10, which may be fixed or detachably secured to a camera, and a film package 11 of the present invention.

The film package 11 is best seen in FIGS. 2, 3 and 4, as including a generally flat, substantially rectangular sheet of film 12, which may be conventional per se, having a photosensitive layer 13 on one face, the upper face as seen in FIGS. 2–4. A covering 15 envelops or covers the film sheet 12, and, in the instant embodiment, assumes the form of an envelope having a back side or sheet 16 in completely covering relation with the back surface of the film 12. Extending from opposite side edges of the back envelope sheet 16, being turned upwardly along the film side edges and inwardly to overlie marginal side portions of the front film face are side mask portions 17. At one end of the envelope back sheet 16 there is an extension turned upwardly along the adjacent edge of the film 12 and inwardly overlying the adjacent end margin of the front film face 13 to define an end mask portion 18. The other end of envelope back sheet 16, remote from mask portion 18, extends outwardly, as at 19, beyond the adjacent end edge of the film 12, and is folded upon itself, as at 20, whence it extends inwardly, as at 21 in overlying facing engagement with the extension 19, and terminates in a mask end portion 22 overlying the adjacent marginal end portion of front film face 13. In practice, the side mask portions 17 and end mask portions 18 and 22 may be suitably secured to each other and the contained film 12; and, overlying extension portions 19 and 21 may be adhesively secured in their facing engagement to define a stiffened tab. Thus, as best seen in FIG. 2, the side mask portion 17 and end mask portions 18 and 22 combine to define a mask extending peripherally about the margin of the photosensitive face 13 of film 12. That is, the mask portions 17, 18 and 22 combine to define in the space therewithin a window exposing the photosensitive layer 13 of film 12 except along the peripheral margin thereof.

In order to maintain the photosensitive layer 13 of film 12 in an unexposed or light-free condition both prior and subsequent to the desired exposure, a closure sheet 23 is superposed on the mask 17, 18 and 22 in closing relation with respect to the mask window, to exclude actinic light from the layer 13. The closure sheet 23 is of thin, flexible, opaque material, being generally rectangular in outline configuration, and having one end portion 24 overlying and adhesively fixed to the mask end portion 22 and adjacent region of tab layer 21. The closure sheet 23 has its side margins 25 respectively overlying and in detachable adherent relation relative to the mask side portions 17. The remaining end margin 26 overlies and is detachably adhesively secured to the mask end portion 18. In addition, an engaging member 27 may be carried on the outer or front surface of the closure sheet end portion 26, for a purpose appearing presently. The engaging portion 27 may be of adhesive, or of the fabric fastener type sold under the trademark Velcro.

It will now be appreciated that the film package 11 includes the film 12 which is effectively protected on its back face and edges from light by the opaque envelope back sheet 16, while the mask portion 17, 18 and 22 combine to exclude light from the peripheral margin of the front film face 13, defining a central window which is openably closed by the closure sheet 23 in a manner appearing more fully hereinafter.

The camera device 10 includes a generally flat housing 30 having a closed, generally rectangular backwall 31, and a front wall 32 disposed in forwardly spaced parallelism with the backwall and having a generally rectangular through opening 33. A pair of sidewalls 34 and 35 extend between adjacent side edges of the front and backwalls 31 and 32, and a pair of end walls 36 and 37 extend between adjacent end edges of the front and back walls. In association with a camera, shown in phantom at 29 in FIG. 6, the housing 30 is disposed with its front wall 32 facing forwardly to receive through the front wall window 33 light rays passing into the camera through the camera lens.

As best seen in FIGS. 1 and 6, the front housing wall opening 33 is offset longitudinally toward the housing end of edge wall 36, being spaced from the housing end of wall 37. Thus, the housing 30 adjacent to the end or edge wall 37 is closed, and in assembly with a camera may extend beyond the camera, as seen in FIG. 6. Formed in the housing end or edge wall 37, extending longitudinally therealong and proximate to the housing backwall 31 is an elongate slot or passageway 38 which may be bounded by an outwardly projecting tubular formation or receiver 39. Thus, the end edge slot 38 communicates with the interior of the housing 30 and, through the receiver 39 with the exterior of the housing, the slot and receiver being substantially flush on one interior side with the inner or front surface of housing backwall 31. Just inward of the slot 38, interiorly of the housing 30, there is located a pressure roll 40, say of rubber or other frictional material. The pressure roll 40 extends longitudinally along the housing edge wall 37 and is provided at its opposite ends with axial stub shafts 41 and 42. As best seen in FIG. 5, the pressure roll 40 terminates at its opposite ends proximate to respective housing sidewalls 34 and 35, which walls are formed with transverse slots 43 and 44 respectively receiving stub shafts 41 and 42. The slots 43 and 44 serve to journal the shafts 41 and 42 to rotatably support the pressure roll 40 while permitting slight lateral or forwardly and rearwardly displacement of the pressure roll. Suitable resilient means, such as a coil tension spring 45 is connected at one end to the stub shaft 41, and connected at its other end to a pin 46 fixed to the wall 34 rearwardly of the shaft 41. Similar resilient means, such as a tension spring 47 may be connected at one end to stub shaft 42 and have its other end fixed by any suitable means to the wall 35 rearwardly of the stub shaft. By this means, the pressure roll 40 is resiliently urged rearwardly toward rear housing wall 31 to effectively exclude light from entering the housing through slot 38. Further, cooperating light trap means, such as velvet fabric, felt, or the like, may be carried by rear wall 31, as at 48 for lighttight engagement with the pressure roll 40 in its extreme position of movement toward the rear wall. An additional light trap device 49 may be carried by the front housing wall 32 in cooperating relation with the forward side of the pressure roll 40, being depressible to facilitate forward movement of the pressure roll. Also, a light trap 50 may be employed in the receiver tube 39, if desired.

On the inner surface of each housing sidewall 34 and 35, extending in adjacent spaced facing relation with respect to the rear housing wall 31, is a rib 52 and 53, respectively. More particularly, the ribs or flanges 52 and 53 each extend along their respective sidewalls 34 and 35 from a location proximate to the pressure roll 40 toward the housing end wall 36. Extending along the housing end wall 36, in adjacent spaced facing relation with the housing rear wall 41 and between the ribs or flanges 52 and 53 is an additional rib or flange 54. As best seen in FIG. 6, the ribs or flanges 52, 54 and 53 combine with the adjacent walls 34, 36 and 35, and rear wall 31 to provide channels defining a guideway 55 opening at one end toward the slot 38. The guideway 55 is dimensioned for close sliding reception therein of the marginal edge regions of film package 11, as will appear hereinafter in greater detail.

Interiorly of the housing 30, adjacent to and on the inner side of pressure roll 40, is a coiling roll 56. The coiling roll 56 may be of less diameter than the pressure roll 40, extending generally parallel to and inward of the pressure roll, and terminating at its opposite ends just short of the side ribs 52 and 53. Extending from opposite ends of the coiling roll 56 are stub shafts 57 and 58 which extend forwardly of and across respective ribs or flanges 52 and 53 and through transverse slots 59 and 60 in respective sidewalls 34 and 35. The coiling roll 56 is thus journaled for axial rotation and shiftable laterally or transversely in the forward and rearward direction within the limits of slots 59 and 60. Suitable resilient means, such as a coil spring 61 has one end connected to coiling roll shaft 57, and its other end connected to a rearwardly located pin 62. Similarly, the other coiling roll shaft 58 may be connected by a spring 63 to a rearwardly located fixed pin 64. In this manner, the coiling roll 56 is resiliently biased rearwardly or toward the rear housing wall 31 between the ribs 52 and 53. The exterior or surface 65 of the coiling roll 56 is provided with complementary engaging means, such as adhesive or fastener fabric of the type carrying the trademark Velcro for mating engagement with the engaging means 27, for purposes appearing hereinafter.

If desired, there may be provided a plurality of holddown rollers, such as rollers 66 and 67, preferably located just inwardly of respective flanges 52 and 53, adjacent to coiling roll 56.

In order to seal the slots 43, 44, 59 and 60, there may be provided enclosures 70 and 71 on respective sidewalls 34 and 35 each enclosing the shaft projecting through the associated guide wall. If desired, the enclosures 70 and 71 may be recessed to receive the free ends of shafts 41, 57 and 58. The shaft 42 extends through a slot 72 in the enclosure 71 and is there provided on its outer end with an external manually actuable knot 73, having a hub 69 of sufficient size to cover the slot 72 in all positions of the pressure roll 40. Within one of the enclosures 70 and 71, say the latter, there may be provided drive means, such as gears 74 and 75; and, an idler gear 76 may be carried on a shaft 77 journaled in the enclosure 71. The idler gear 76 is in meshing engagement with both the gears 74 and 75 respectively keyed to shafts 42 and 58. In this manner, rotation of pressure roll 40 effects positive driving of coiling roll 56 in the same direction of rotation.

In use, it is only necessary to grasp a film package 11 by the extension or tab 19, 21 and insert the distal end edgewise through the receiver 39 and slot 38. It is essential that the closure sheet 23 face forwardly. Continued edgewise insertion of the film package 11 resiliently deflects the pressure roll 40 slightly forwardly and frictionally effects rotation of the pressure roll to drive the coiling roll 56 in the same direction of rotation. The leading edge of the film package 11, along the side margins thereof, engage in guideway 55 beneath respective flanges 52 and 53 to assure that the film package remains planar in flat facing engagement with the rear housing wall 31. Upon movement of the leading film package edge in contact with the coiling roll 56, the coiling roll is displaced forwardly and rolls onto the engaging portion 27. Thereupon, the engaging portion 27 of the closure sheet 23 is detachably secured to the complementary engaging surface 65 of the coiling roll 56. This condition is shown in FIG. 7. Upon further edgewise insertion of the film package 11, the coiling roll 56 continues to rotate, being driven by the pressure roll 40, and thereby coils or winds the closure sheet 23 about the coiling roll, stripping the closure sheet from its detachable securement to the mask regions 17 and 18 of the film package. This coiling action proceeds until the film package 11 is completely inserted in the guideway 55, the condition shown in FIG. 6. It will there be appreciated that the closure sheet 23 has been wound about the coiling roll 56 to completely open the window defined within mask 17, 18 and 22. The film is now in condition for exposure to light passing through the camera lens. In order to assure that the film package 11 is fully inserted, the handwheel or knob 73 may be rotated for additional inserting force.

Subsequent to exposure of the film 12, it is merely necessary to grasp the film package tab 19, 21 and withdraw the film package. This will effect reversal of the above-described operation, wherein rotation of the pressure roll 40 will effect positive unwinding rotation of the coiling roll 56, the latter simultaneously unwinding and replacing the closure sheet 12 in light-excluding relation on the mask 17, 18, so that the withdrawn film package 11 appears identical to that prior to exposure. Here again, the knob 73 may be employed to facilitate withdrawal, if desired. The exposed film 12 may be removed from the package 11 for processing in the conventional manner.

In the slightly modified embodiment shown in FIGS. 10–13, a film package 11a includes a generally rectangular sheet of film 12a having its front face provided with a photosensitive coating 13a. In addition, the film sheet 12a is provided with a covering 15a, which may be in the form of an opaque dye or coating on the rear surface and edges of the film sheet. A generally rectangular mask 17a is suitably secured on the front, photosensitive surface of film sheet 12a covering the peripheral margin thereof. The mask 17a is of suitable opaque material, and may be secured to the film sheet by adhesive or other suitable means. At one end of the film sheet 12a, there is provided a tab 19a having a pair of flaps 22a adhesively or otherwise secured on the upper and lower sides of the film sheet 12a and mask 17a. Thus, the tab 19a extends from one end of the assembled film sheet 12a and mask 17a.

In addition, a flexible, opaque closure sheet 23a is disposed in overlying relation with respect to the mask 17a and film sheet 12a, having one end region 24a overlying and secured to the tab 19a. The closure sheet 23a is detachably secured to the mask 17a in the same manner as the closure sheet 23 described hereinbefore. Carried externally on the closure sheet 23a remote from the tab 19a is an engaging member 27a, which may correspond to the engaging member 27 of the first-described embodiment.

In operation, the film package 11a may be employed in substantially the same manner as the film package 11 during insertion into the camera, exposure and removal from the camera. In the film processing, the covering material of opaque coating 15a may be removed by solvent, or otherwise removed, as may the mask 17a and tab 19a if desired.

From the foregoing, it is seen that the present invention provides a photographic film-holding device and film package which fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention.

What is claimed is:

1. For use with a camera, the combination comprising a generally flat housing for location extending across the path of light through the camera lens and having a window in its front face for passing said light into the housing, said housing having a through slot extending along one housing edge adjacent to the rear wall and opening into the interior of said housing for edgewise passage of a film package along the rear housing wall, a guideway in said housing having one end opening toward said slot for removably receiving the film package passing through said slot, a rotary pressure roll normally disposed in said housing between said slot and said one guideway end and extending along and in light-excluding relation with respect to said slot, mounting means mounting said pressure roll for resilient lateral yielding away from the rear housing wall to pass a film package moving inwardly through said slot in rolling frictional engagement with the film package between said slot and guideway, a rotary coiling roll located in said housing extending along and spaced inward of said pressure roll in the path of movement of the film package and resiliently yieldably mounted for lateral movement away from said rear housing wall in general parallelism with said pressure roll for displacement out of the path of film package movement, and engaging means on the periphery of said coiling roll for adherent engagement with a flexible cover sheet on the film package to automatically wind the cover sheet in convolutions about the coiling roll upon insertion of the film package and unwinding of the cover sheet upon withdrawal of the film package.

2. The combination according to claim 1, in combination with a film package for said edgewise insertion and comprising a generally flat film sheet having a sensitive emulsion on one face, an opaque mask having a central mask window and mounted on the peripheral margin of said one face for registry with said housing window when said film package is fully inserted, an opaque covering on the edges and other face of said sheet, a flexible closure sheet releasably secured to said mask in closing relation with said mask window, and complementary engaging means on said closure sheet adjacent to the entering edge of said package for detachable engagement with said coiling roll engaging means, whereby said closure sheet is coiled in convolutions about and uncoiled from said coiling roll to open and close said mask window upon insertion and withdrawal of said package.

3. The combination according to claim 1, in combination with drive means interposed between said pressure and coiling rolls for positively driving the latter in predetermined relation with respect to the former.

4. The combination according to claim 3 in combination with manually actuable means operatively connected to said pressure roll for directly rotating the latter.